United States Patent
Lodde et al.

(10) Patent No.: US 11,021,635 B2
(45) Date of Patent: Jun. 1, 2021

(54) CABLE WINDING TAPE, IN PARTICULAR FOR AN ENGINE COMPARTMENT OF AN AUTOMOTIVE VEHICLE

(71) Applicant: Coroplast Fritz Müller GmbH & Co. KG, Wuppertal (DE)

(72) Inventors: Christoph Lodde, Holzwickede (DE); Gülay Wittig, Bochum (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 0 days.

(21) Appl. No.: 16/550,647

(22) Filed: Aug. 26, 2019

(65) Prior Publication Data
US 2019/0375964 A1    Dec. 12, 2019

Related U.S. Application Data

(63) Continuation of application No. 14/205,757, filed on Mar. 12, 2014, now Pat. No. 10,428,244.

(30) Foreign Application Priority Data

Mar. 14, 2013   (DE) ..................... 10 2013 102 602.8

(51) Int. Cl.
    *C09J 7/21*     (2018.01)
    *C09J 7/38*     (2018.01)
(52) U.S. Cl.
    CPC .  *C09J 7/21* (2018.01); *C09J 7/38* (2018.01); *C09J 2203/302* (2013.01);
    (Continued)
(58) Field of Classification Search
    CPC . C09J 7/21; C09J 7/38; C09J 2203/302; C09J 2400/263; C09J 2433/00;
    (Continued)

(56) References Cited

U.S. PATENT DOCUMENTS

| 4,936,135 A | 6/1990 | Annis |
| 2004/0127121 A1 | 7/2004 | Schwab et al. |
| 2011/0111665 A1 | 5/2011 | Lodde et al. |

FOREIGN PATENT DOCUMENTS

| CN | 201990810 U | 9/2011 |
| DE | 102008058226 A1 | 2/2010 |

(Continued)

OTHER PUBLICATIONS

Kadolph, Sara J. et al., "Yarn Classification," Chapter 11, Textiles, Ninth Edition 2002 by Pearson Education, Inc., Published by Prentice Hall, Inc., 14 pages.

(Continued)

*Primary Examiner* — Elizabeth C Imani

(74) *Attorney, Agent, or Firm* — Dickinson Wright PLLC

(57) ABSTRACT

A cable wrapping tape, in particular for the engine compartment of an automobile, has a strip-like carrier consisting of fabric, said carrier is provided at least on one side with a self-adhering adhesive layer which consists of a pressure-sensitive adhesive, wherein the fabric of the carrier consists of a yarn which is formed from a polyamide material and which has a yarn strength of at least 280 dtex. The yarn is formed from 24 to 80 filaments, and the cable wrapping tape meets abrasion class E according to LV 312 both on a mandrel having a 5 mm diameter and on a mandrel having a 10 mm diameter. For increasing the abrasion resistance, it is proposed that the filaments are twisted with one another about a central longitudinal axis (X-X) of the yarn.

21 Claims, 2 Drawing Sheets

(52) U.S. Cl.
CPC ...... *C09J 2400/263* (2013.01); *C09J 2433/00* (2013.01); *C09J 2477/006* (2013.01); *Y10T 442/2008* (2015.04)

(58) Field of Classification Search
CPC ............ C09J 2477/006; C09J 2301/312; C09J 2301/302; Y10T 442/2008; F01L 1/3442; F01L 1/344; F01L 2001/34483; D03D 15/49; D03D 3/005; D10B 2331/02; D10B 2505/02
See application file for complete search history.

(56) References Cited

FOREIGN PATENT DOCUMENTS

| | | |
|---|---|---|
| EP | 1911633 A1 | 4/2008 |
| GB | 1437938 | 6/1976 |
| JP | 2012017415 A | 1/2012 |
| WO | 2011054842 A1 | 5/2011 |

OTHER PUBLICATIONS

Twist Bleed, 2001, Celanese Acetate LLC, 1 page.
Complete Textile Glossary, Celanese Acetate LLC, 2001, Stichwort: Verdrehung (Twist, Twisting), https://www.fashiontrendsetter.com/downloads/Fiber Dictionary.pdf (recherchiert am Sep. 9, 2019 (7 pages).
"Physical Testing of Textiles" by B. P. Saville, The Textile Institute, Woodhead Publishing ISBN 1 85573 367 6, CRC Press ISBN 0-8493-0568-3, Woodhead Publishing Ltd, 1999, 7 pages.

CABLE WINDING TAPE, IN PARTICULAR FOR AN ENGINE COMPARTMENT OF AN AUTOMOTIVE VEHICLE

CROSS-REFERENCE TO RELATED APPLICATIONS

This application is a continuation of U.S. patent application Ser. No. 14/205,757 filed Mar. 12, 2014, which claims priority to German Patent Application No. 10 2013 102 602.8, filed Mar. 14, 2013, the entirety of all disclosures being herewith incorporated by reference.

BACKGROUND

The present invention relates to a cable wrapping tape, in particular for the engine compartment of an automobile, having a strip-like carrier consisting of fabric, which is provided at least on one side with a self-adhering adhesive layer which consists of a pressure-sensitive adhesive, wherein the fabric of the carrier consists of a yarn which is formed from a polyamide material and which has a yarn weight of at least 280 dtex, wherein the yarn is formed from 24 to 80 filaments and wherein the cable wrapping tape meets abrasion class E according to LV 312 both on a mandrel having a 5 mm diameter and on a mandrel having a 10 mm diameter.

An adhesive tape of this type is known from EP 1 911 633 A1. In this case it is a cable wrapping tape that costs little to manufacture, that in particular has a thickness of less than 0.5 mm and has a high abrasion resistance while avoiding the presence of a velour- or nonwoven-layer. Moreover, the known adhesive tape also fulfills further requirements which are summarized in the LV 312 "Adhesive tapes for cable sets in motor vehicles" (1/2005) common test guidelines of the firms Audi, BMW, DC, and VW. In particular, while the known adhesive tape consists of polyamide, it has a pliancy like a polyester fabric adhesive tape and is workable both manually and by machine.

The object of the invention is to provide an adhesive tape of the above-described type, which while maintaining the advantages of the known tape, provides an even higher abrasion resistance.

SUMMARY

This is inventively achieved in that the filaments are twisted with one another about a central longitudinal axis of the yarn.

One known method for yarn stabilization in staple fiber yarns is to twist the fibers together, firstly in order to manufacture a workable thread from individual fibers of short length, wherein the goal is to transfer the strength of the individual fibers in the highest possible degree to the fiber composite. A method of this type is not necessary with filament yarns. While the yarn twisting is indispensably required with fabrics that are manufactured from staple fibers in order to achieve a cohesion having sufficient strength of the short fibers in the yarn, a twisting of yarns manufactured from filaments is indeed known in principle, but not usual. Thus yarns which consist of polyester and therefore tend to experience electrostatic charge receive a so-called protective twist of a few turns per meter in order to counteract this charge.

Surprisingly, using the invention it is possible to increase the abrasion resistance of an adhesive tape of the above-mentioned type by an extraordinary degree. The abrasion resistance is determined according to the above-mentioned test guideline LV 312 based on ISO 6722-1 (2011-10) by first adhering the adhesive tape to a mandrel (metal rod) having a 5 or 10 mm diameter. Using a scraping tool that has a needle diameter of 0.45 mm, the number of strokes required to fray the adhesive tape is then determined under a weight force of 7 N. The classification presented in Table 1 below indicates the abrasion resistance in LV 312.

The known adhesive tapes indeed already fulfill the requirements of abrasion class E, since approximately 6600 to 8000 strokes are required on 5 mm mandrel before the tape is cut through, however an abrasion increase of up to double the value, and thus meeting the requirements for class G special applications, can be achieved by the invention.

TABLE 1

Organization of Abrasion Classes According to LV 312

| Abrasion Class | Requirement (Number of Strokes) |
| --- | --- |
| A - No Abrasion Protection | <100 |
| B - Low Abrasion Protection | 100-499 |
| C - Medium Abrasion Protection | 500-999 |
| D - High Abrasion Protection | 1000-4999 |
| E - Very High Abrasion Protection | 5000-14999 |
| F - Extremely High Abrasion Protection | 15000-30000 |
| G - Abrasion Protection for Special Applications | ≥30000 |

The yarns used for manufacturing the yarns used for the fabric carrier of the inventive adhesive tape are multifilament yarns spun from the spinnerets, said multifilament yarns consist of filaments lying parallel adjacent to one another which can preferably also be intermingled prior to the twisting. During twisting on twisting machines, which are commonly used in the textile industry for twisting two or more yarns, they receive a twist, i.e. they are rotated about each other—or the yarn composite is rotated about its own axis—and thereby obtain a greater cohesion. In this way a more stable, rounder yarn body is obtained. Here a distinction is made according to DIN 60 900-4 (1988-07)—as with twisted staple fibers—based on the direction of rotation between S (right-hand twist) and Z (left-hand twist) depending on whether the individual filaments in the thread extend parallel to the slant of an S or Z when the thread is hung vertically.

The twist conferred is specified as the number of turns of the thread per m (T/m). During the twisting the filaments can have in particular a number of turns based on a meter length (T/m) in the range of 10 to 400, wherein it is particularly preferable if the filaments have a number of turns, based on a meter length (T/m), in the range of 140 to 260. Taking into account the linear density of the yarn and the filament count used for its construction, the above-mentioned optimal number of turns thus leads to a preferred pitch angle of the filaments in the yarn composite. It has surprisingly been shown here that despite the absence of velour- or nonwoven-layers in the carrier, with the inventive yarn structure it is possible to manufacture a cable wrapping tape with relatively little thickness, in particular a thickness of 0.30 to 0.45 mm, and with the very highest abrasion resistance.

Here there is apparently a synergistic effect of the combination of polyamide material of the yarn with its linear density, its filament structure, and with the twisting. Due to the different linear density and strength of spun filaments, each yarn material namely requires specific twisting values in order to achieve the desired properties for a yarn intended for a certain use.

With increasing twisting of a yarn, the tensile strength for example of a yarn increases, until a certain specific maximum is reached. Thereafter this strength decreases again by over twisting of the yarn. Thus with no or only a small amount of twisting, the filaments can still slide against one another, wherein only the adhesive forces and a low sliding friction must be overcome. The yarn in this case is soft, pliant, and filling, but relatively sensitive in processing. With increasing twisting of the yarn, a constricting force arises which prevents this mobility. The yarn is thus harder and less sensitive to processing, but also less pliant and less filling. The filaments are increasingly less able to slide past one another and are increasingly strained until finally— starting, as a rule, with the outer-lying filaments in the yarn—a rupturing results. The level of the achievable maximum thus depends on the count of the filaments as well as their strength and flexural rigidity, on the friction between the filaments and their surface adhesive forces. All of these latter properties are intrinsically considerably influenced by the filament material—the polyamide in the inventive case. With respect to the solution of the object of the invention, the above-specified optimal number of turns in the range of 10 to 400 based on a meter length is to be seen as a value which still lies below the achievable maximum (approximately 2200 T/m to 2500 T/m), so that the yarn indeed leads to the desired increased abrasion resistance, but still remains pliant, which for example is manifested in the flagging value of the tape, and in that its manufacture is not too cost-intensive.

The inventive twist structure thus influences the yarn properties, its processability for textile end products, and finally the properties of the inventive adhesive tape. Its uniformity or non-uniformity over the yarn length and across the yarn cross-section are also influenced by the spinning method and the manner of the distribution of twists in the yarn, wherein these are however to be seen as non-critical with respect to the solution of the object underlying the invention.

Surprisingly, using this combination of carrier-, adhesive-, and coating-material, it is possible to inventively provide an adhesive tape which is unrollably wrapable onto itself without interliner while maintaining excellent relevant performance characteristics, wherein the inventive adhesive tape is also manufacturable and processable with low expense.

In the fabric of the carrier it is thus possible that either only the filaments of the warp, or only the filaments of the weft, are twisted around one another about a central longitudinal axis of the yarn, or that both the warp and the weft thereof have an inventive twist. For a combination of advantageous filling properties with a good weavability in the manufacture of the carrier of the inventive adhesive tape, the filaments of the yarn of the warp can have a greater number of twists based on a meter length than the filaments in the yarn of the weft.

With regard to the adhesive coating, acrylate adhesives, in particular UV-curable acrylate adhesives, but also synthetic- and also natural-rubber adhesives can be preferably used as pressure-sensitive adhesives. Adhesive tapes having acrylate adhesives are characterized by low fogging values, a high resistance to various chemical influences, and by an excellent compatibility with different cables.

In order to achieve an adhesion value on the tape backs of preferably 5.7 to 6.4 N/cm, which adhesion value is required for a helical wrapping of cable sets, coating weights of the adhesive coating of 60 to 150 g/m$^2$, preferably of 95 to 105 g/m$^2$, are advantageously employed.

Further advantageous embodiments of the invention are contained in the following specific description. The invention is explained in more detail with respect to the drawings based on an exemplary embodiment and a comparative example. The drawings are provided only for illustrative purposes and are not intended to limit the scope of the present invention.

DETAILED DESCRIPTION OF THE DRAWINGS

Figure 1:
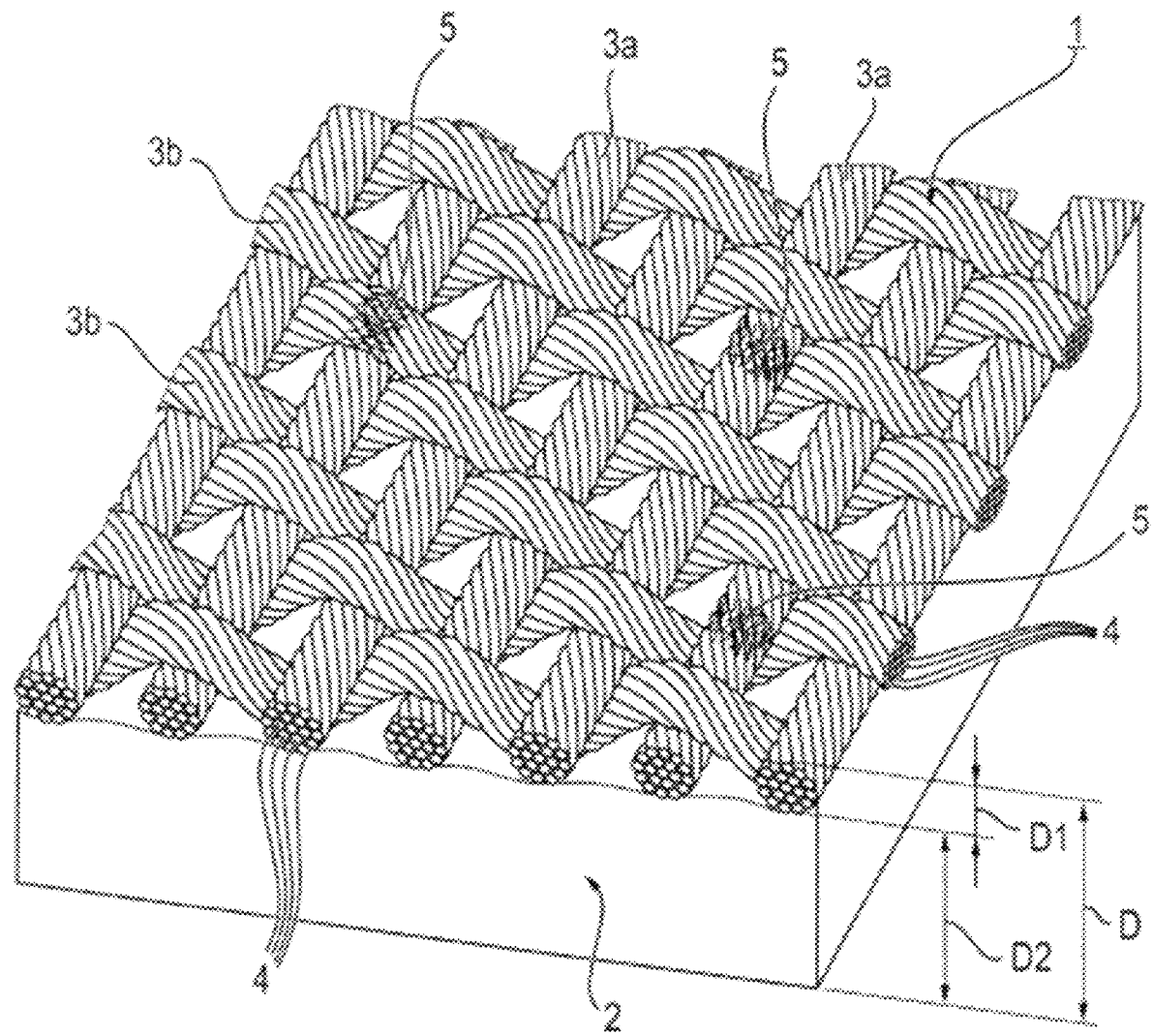
FIG. 1 shows a perspective cross-section through an inventive cable wrapping tape.

As is apparent from FIG. 1, an inventive cable wrapping tape, in particular a cable wrapping tape specified for use in the engine compartment of an automobile, comprises a strip-like carrier 1 consisting of fabric, said carrier is provided on at least one side with a self-adhering adhesive layer 2 which consists of a pressure-sensitive adhesive. On a mandrel having a 5 mm diameter, as well as on a mandrel having a 10 mm diameter, the cable wrapping tape meets at least abrasion class E according to LV 312. However abrasion class F or even G according to LV 312 can also be met.

The fabric of the carrier 1 consists of a yarn 3a, 3b which is formed from a polyamide material, in particular from PA 6.6, and which has a yarn weight of more than 280 dtex, in particular of 470 dtex. In general, in the context of the invention it can be provided in particular that the yarn weight lies in the range of 280 dtex to 1000 dtex, preferably in the range of 300 dtex to 470 dtex.

Figure 2:
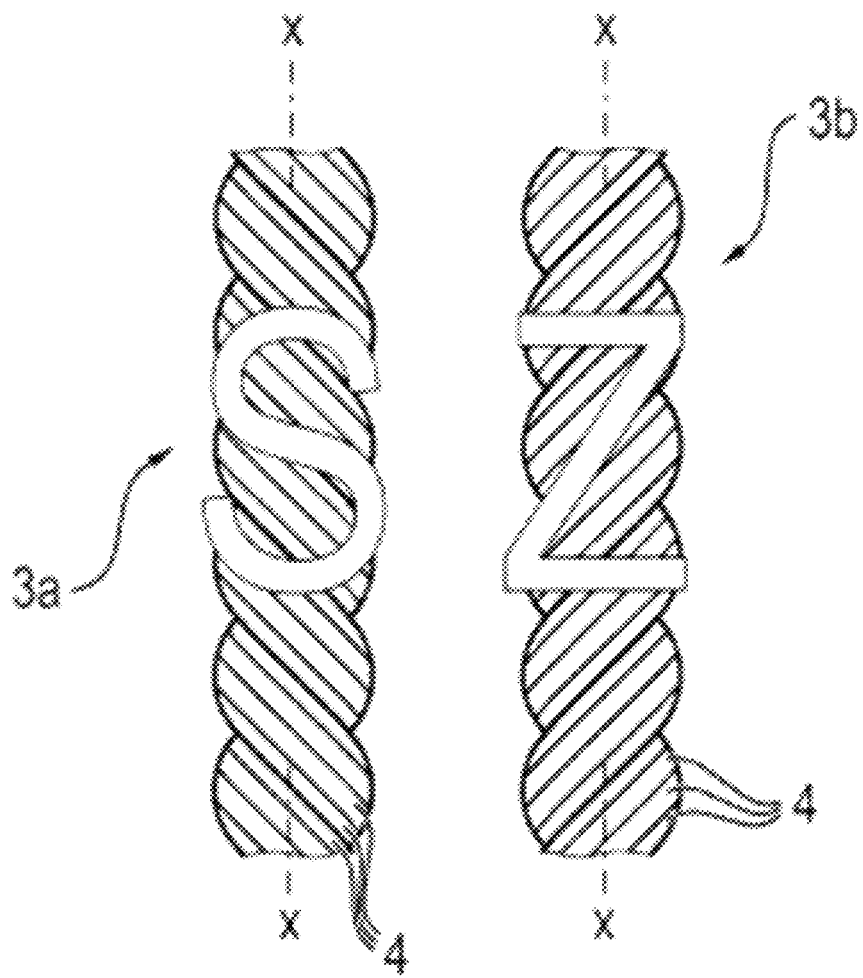
FIG. 2 shows the view of two yarns for manufacturing a fabric carrier for an inventive cable wrapping tape.

The yarn 3a, 3b which is exemplarily illustrated in FIG. 2 in two embodiments, is formed from 24 to 80 filaments 4, in particular from 48 to 80 filaments 4, preferably from 68 filaments 4. No staple fibers have been used for forming the yarn 3a, 3b.

The filaments 4 are inventively twisted with one another about a central longitudinal axis X-X of the yarn 3a, 3b, wherein they have in particular—based on a meter length—a number of twists (T/m) in the range of 10 to 400, preferably in the range of 140 to 260. The starting point for the specification of the number of twists (T/m) in this case is of course a substantially parallel layer of the filaments 4 in an untwisted yarn.

Here this "substantially parallel" layer is not only understood to mean that a certain skew of the filaments 4 to one another over the length in an untwisted yarn can never be ruled out, but also that an untwisted yarn can be intermingled, wherein in particular 8 to 26 intermingling points per meter can be present. The intermingling—also referred to as interlacing—is an additional finishing of the yarn threads wherein the filaments 4 of the yarn are intertwined at points by a swirling with air. The cohesion of the individual filaments 4 is thus not achieved by a twisting, but by an interlacing of the filaments 4. Such intermingling points, which represent interlace knots, which generally do not disappear during twisting, are indicated in FIG. 1 by the reference number 5. The intermingling can be carried out with smooth filaments 4, however it is also possible, and inventively preferred, to combine an intermingling with a texturing.

The texturing advantageously contributes to the abrasion resistance. In the textile industry, "texturing" refers here to a process whereby synthetic fibers can be permanently rippled. Due to this finishing, the smooth synthetic filaments 4 or yarns 3a, 3b obtain a character similar to that of natural fiber and a textile feel. The texturing usually takes place under the influence of heat and pressure, wherein a thermoplasticity of the fibers is exploited. Fiber loops are generated by a rippling of the fibers during the texturing, whereby an increase in volume results, wherein the elastic ductility increases while the thermal conductivity decreases. A variety of in particular mechanical, mechanical-thermal, and chemical-thermal methods are known for carrying out the texturing.

The threads of the yarn 3a, 3b form warps in the carrier 1, said warps preferably extend in the longitudinal direction of the tape, and wefts which preferably extend in the transverse direction of the tape.

As is apparent from the drawings, different directions of rotation can be used for the yarns 3a, 3b. Thus the yarn 3a illustrated at the left side of FIG. 2 can have a right-hand twist where it is evident that when the thread is hung vertically, the individual filaments 4 extend parallel to the slant of an S. The yarn 3b illustrated at the right side of FIG. 2 has a left-hand twist where it is evident that when the thread is hung vertically, the individual filaments 4 extend parallel to the slant of a Z. In the fabric of the carrier 1 according to FIG. 1, the yarns 3a lying substantially vertical in the image plane are those with left-hand twist of their filaments 4, and the yarns 3b lying substantially horizontal in the image plane are those with right-hand twist of their filaments 4.

The cable wrapping tape has a thickness which is indicated by reference number D and is smaller than 0.50 mm. In particular, the thickness D lies in a range of 0.28 to 0.32 mm. The thickness D of the cable wrapping tape is composed here of the thickness D1 of the carrier 1 and the thickness D2 of the adhesive layer 2, which is determined by the grammage and the thickness of the adhesive.

In particular, a cable wrapping tape was manufactured as an exemplary embodiment for the invention, the carrier 1 of said cable wrapping tape had the fabric construction reproduced in Table 2 below. The parameters specified in Table 2 as basic data of the carrier 1 were determined according to the following standards: DIN EN ISO 2286-1 (1998-07) for the specific weight of the carrier 1, fiber strength (linear density in dtex) according to DIN 53830-3 (1981-05), thread thickness according to DIN EN 1049-2 (1994-02), and DIN EN ISO 9237 (1995-12) for the air permeability.

With regard to Table 2 it is highlighted here that the air permeability, i.e. the porosity, of the carrier 1 increases only to a slight extent due to the twisting of the filaments 4 in the yarns 3a, 3b. This advantageously affects the coatability of the carrier 1 with adhesive, the viscosity of said adhesive need not be changed much or at all in comparison to conventional tape.

The carrier 1 was coated on one side with approximately 100 g/m² of a UV-curing acrylate adhesive. For forming the adhesive coating 2, the acrylate was cured and the material wound on itself. The roll thus formed was subsequently assembled in a desired manner as adhesive tape wound on itself.

TABLE 2

Construction of the Fabric of the Carrier 1 of an Inventive Cable Wrapping Tape Compared to a Known Carrier Fabric

| Parameter | Unit | Comparison Carrier | Invention |
|---|---|---|---|
| Material | | PA Fabric | PA fabric |
| Material Type | | PA 6.6 | PA 6.6 |
| Warp Filament Type | | Smooth or Textured; Piece-Dyed | Smooth or Textured; Piece-Dyed |
| Weft Filament Type | | Smooth or Textured; Piece-Dyed | Smooth or Textured; Piece-Dyed |
| Grammage | g/m² | 185 ± 5 | 185 ± 5 |
| Air Permeability | l/m²s | 50-200 | 50-400 |
| Warp Yarn Weight | dtex | 470 | 470 |
| Weft Yarn Weight | dtex | 470 | 470 |
| Warp Filament Count | | 68 | 68 |
| Weft Filament Count | | 68 | 68 |
| Warp Twist Direction | | None | S or Z |
| Weft Twist Direction | | None | S or Z |
| Warp Twist Count | T/m | 0 | 180 ± 5 |
| Weft Twist Count | T/m | 0 | 180 ± 5 |
| Warp Yarn Thread Count | 1/cm | 20 ± 3 | 20 ± 3 |
| Weft Yarn Thread Count | 1/cm | 16 ± 3 | 16 ± 3 |

In addition to the high values of abrasion resistance and low tape thickness D in comparison to composite materials, the inventive tape manufactured in this manner had a very good temperature stability (125° C./150° C. according to LV 312), was processable manually and by machine, pliant, and showed no flagging in processing.

TABLE 3

Basic Data of an Inventive Cable Wrapping Tape ("Invention") Compared to a Known PA Fabric Cable Wrapping Tape ("Comparison")

| Property | Unit | Comparison | Invention |
|---|---|---|---|
| Carrier Material | — | PA | PA |
| Carrier Weight | g/m² | 130-250 (185 ± 5) | 130-250 (185 ± 5) |
| Warp Thread Count | 1/cm | 17-60 (20 ± 3) | 17-60 (20 ± 3) |
| Weft Thread Count | 1/cm | 10-30 (16 ± 3) | 10-30 (16 ± 3) |
| Adhesive Application | g/m² | 95-105 | 95-105 |
| Tape Thickness D | mm | 0.27-0.30 | 0.28-0.32 |
| Mechanical Values | | | |
| Elongation at Break | % | 25-30 | 28-35 |
| Breaking Force | N/cm | 400-500 | 600-800 |
| Adhesive Force | | | |
| On Steel | N/cm | 6.0-10.0 | 6.0-10.0 |
| On Tape Backs | N/cm | 5.0-9.0 | 5.0-10.0 |
| Unwind Adhesion | N/19 mm | 2.0-5.0 | 2.0-5.0 |
| Flagging 30 min, 24 h | — | No Flagging | No Flagging |
| Abrasion Resistance with 5 mm Mandrel | Strokes | 6600-8000 | 11000-15500 |

In Table 3 above, the basic data of an inventive cable wrapping tape ("Invention" column) with its possible variation ranges and—specified in parentheses—preferred variation ranges are compared to those of a known PA fabric cable wrapping tape ("Comparison" column) of the aforementioned type.

Determination of the specified technical parameters was effected here according to the respective common standards: DIN EN ISO 2286-1 (1998-07) for the specific weight of carrier 1, DIN EN 1942 (2008-06) for the thickness D, DIN EN 14410 (2003-06) for the mechanical values, DIN EN 1939 (2003-12) for the adhesive force, and DIN EN 1944 (1996-04) for the unwind adhesion of the adhesive tape. The flagging behavior and abrasion resistance were determined according to LV 312.

It is clear from Table 3 that, among other things, the property changes explained above with respect to the tensile strength of the yarn 3a, 3b ("Breaking force" cell), where said property changes occur with increasing twisting of a yarn 3a, 3b, are also valid for the abrasion resistance of the yarn 3a, 3b, although no direct causal relationship exists between these two properties and these properties are determined by other methods of measurement. The inventively achievable abrasion resistance surprisingly increases up to about two abrasion classes (class F or G) higher than with the known adhesive tape (class E), which was already extremely high compared to previously known PET tapes with low tape thickness D.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled. For example, the tabular listing of the inventively preferred parameters in Tables 2 and 3 does not mean that the ranges and/or values contained in a cell are disclosed necessarily only in connection with the ranges and/or values in a cell or all cells, or that they must be changed simultaneously therewith.

What is claimed is:

1. A cable wrapping tape comprising a strip carrier consisting of fabric, the carrier on at least one side having a self-adhering adhesive layer consisting of a pressure-sensitive acrylate adhesive applied with a specific surface weight from approximately 60 to 150 g/m$^2$,
    wherein the fabric of the carrier consists of a yarn consisting of filaments of a polyamide material and having a yarn linear density of at least 280 dtex, the yarn forming warps and wefts in the fabric of the carrier and does not contain any staple fibers,
    wherein the filaments have a number of twists based on a meter length (T/m) in the range of 80 to 400 and whereby only the filaments of the yarn of the warp, only the filaments of the yarn of the weft, or both the filaments of the yarn of the warp and weft are twisted with one another about the central longitudinal axis (X-X) of the yarn,
    wherein the cable wrapping tape meets abrasion class E or higher, according to LV 312 both on a mandrel having a 5 mm diameter and on a mandrel having a 10 mm diameter and has an unwind adhesion that lies in the range from 2.0 to 5.0 N/19 mm.

2. The cable wrapping tape according to claim 1, wherein the warp extends in the longitudinal direction of the cable wrapping tape, and the weft extends in the transverse direction of cable wrapping tape.

3. The cable wrapping tape according to claim 1, wherein the cable wrapping tape has a thickness D of less than 0.50 mm.

4. The cable wrapping tape according to claim 1, wherein the carrier has a grammage from 130 to 250 g/m$^2$.

5. The cable wrapping tape according to claim 1, wherein the number of warp threads in the fabric of the carrier lies in the range from 17 to 60 per cm.

6. The cable wrapping tape according to claim 1, wherein the number of weft threads in the fabric of the carrier lies in the range from 10 to 30 per cm.

7. The cable wrapping tape according to claim 1, wherein the yarn linear density lies in the range from 280 dtex to 1000 dtex.

8. The cable wrapping tape according to claim 1, wherein the yarn is formed from 48 to 80 filaments.

9. The cable wrapping tape according to claim 1, wherein the yarn is intermingled with 8 to 26 intermingling points per meter.

10. The cable wrapping tape according to claim 1, wherein the filaments of the yarn are textured.

11. The cable wrapping tape according to claim 1, wherein the cable wrapping tape has an elongation at break of 28% to 35%.

12. The cable wrapping tape according to claim 1, wherein the cable wrapping tape withstands a breaking force in the range from 600 N/cm to 800 N/cm.

13. The cable wrapping tape according to claim 1, wherein the adhesive force on the tape backs lies in the range from 5.0 to 10.0 N/cm.

14. The cable wrapping tape according to claim 1, wherein the adhesive force on steel lies in the range from 6.0 to 10.0 N/cm.

15. The cable wrapping tape according to claim 1, wherein the twisted yarn comprises a right-hand twist, a left-hand twist, or a combination thereof.

16. The cable wrapping tape according to claim 1, wherein the filaments have a number of twists based on a meter length (T/m) in the range of 140 to 260.

17. The cable wrapping tape according to claim 1, wherein the cable wrapping tape meets abrasion class F or G, according to LV 312 both on a mandrel having a 5 mm diameter and on a mandrel having a 10 mm diameter.

18. A cable wrapping tape comprising a strip carrier consisting of fabric, the carrier on at least one side having a self-adhering adhesive layer consisting of a pressure-sensitive acrylate adhesive applied with a specific surface weight from approximately 60 to 150 g/m$^2$, the carrier having a grammage from 130 to 250 g/m$^2$,
    wherein the fabric of the carrier consists of a yarn consisting of filaments of a polyamide material and having a yarn linear density of at least 280 dtex, the yarn forming warps and wefts in the fabric of the carrier and does not contain any staple fibers, such that the warps extend in the longitudinal direction of the cable wrapping tape, and the wefts extend in the transverse direction of cable wrapping tape,
    wherein the filaments have a number of twists based on a meter length (T/m) in the range of 80 to 400 and whereby only the filaments of the yarn of the warp, only the filaments of the yarn of the weft, or both the filaments of the yarn of the warp and weft are twisted with one another about the central longitudinal axis (X-X) of the yarn,
    wherein the cable wrapping tape has a thickness that is smaller than 0.50 mm, meets abrasion class E or higher, according to LV 312 both on a mandrel having a 5 mm diameter and on a mandrel having a 10 mm diameter, and has an unwind adhesion that lies in the range from 2.0 to 5.0 N/19 mm.

19. The cable wrapping tape according to claim 18, wherein the yarn is intermingled with 8 to 26 intermingling points per meter.

20. The cable wrapping tape according to claim 18, wherein the cable wrapping tape meets abrasion class F or G, according to LV 312 both on a mandrel having a 5 mm diameter and on a mandrel having a 10 mm diameter.

21. The cable wrapping tape according to claim 18, wherein the filaments have a number of twists based on a meter length (T/m) in the range of 140 to 260.

* * * * *